(12) United States Patent
Yu

(10) Patent No.: US 12,147,149 B2
(45) Date of Patent: Nov. 19, 2024

(54) CAMERA LIFTING STRUCTURE AND DISPLAY DEVICE

(71) Applicant: AmTRAN Technology Co., Ltd., New Taipei (TW)

(72) Inventor: Chien Cheng Yu, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 339 days.

(21) Appl. No.: 17/652,484

(22) Filed: Feb. 24, 2022

(65) Prior Publication Data

US 2023/0141223 A1    May 11, 2023

(30) Foreign Application Priority Data

Nov. 8, 2021   (TW) .................................. 110141572

(51) Int. Cl.
*F16M 11/38* (2006.01)
*G03B 17/56* (2021.01)
*H04N 23/57* (2023.01)

(52) U.S. Cl.
CPC .......... *G03B 17/561* (2013.01); *F16M 11/38* (2013.01); *H04N 23/57* (2023.01); *F16M 2200/068* (2013.01)

(58) Field of Classification Search
CPC ...... G03B 17/56; G03B 17/561; H04N 23/57; F16M 11/38; F16M 2200/068; F16M 11/24
See application file for complete search history.

(56) References Cited

U.S. PATENT DOCUMENTS

2016/0216597 A1* 7/2016 Lim ..................... G03B 17/566

FOREIGN PATENT DOCUMENTS

| CN | 108924311 A | * | 11/2018 | ............ H04M 1/026 |
| CN | 110529700 A | | 12/2019 | |
| CN | 111541801 A | * | 8/2020 | |
| CN | 112261272 A | | 1/2021 | |
| CN | 212900739 U | | 4/2021 | |
| WO | WO-2019105252 A1 | * | 6/2019 | ............... G06F 1/16 |

* cited by examiner

*Primary Examiner* — Clayton E. LaBalle
*Assistant Examiner* — Fang-Chi Chang
(74) *Attorney, Agent, or Firm* — CKC & Partners Co., LLC

(57) ABSTRACT

A camera lifting structure includes a rail bracket, two fixing portions, two elastic elements, two sliding portions, two connecting rods and a camera module. The rail bracket extends along a first direction. The fixing portions are disposed on two ends of the rail bracket. The elastic elements locate between the fixing portions. Each elastic element has a first end and a second end. Each first end connects with the corresponding fixing portion. The sliding portions respectively connect with the corresponding second end and are configured to slide along the first direction relative to the rail bracket. Each connecting rod has a third end and a fourth end. Each third end is pivotally connected with the corresponding sliding portion. The camera module pivotally connects with the fourth ends and is configured to move relative to the rail bracket along a second direction perpendicular to the first direction.

20 Claims, 14 Drawing Sheets

B-B

A-A

CAMERA LIFTING STRUCTURE AND DISPLAY DEVICE

RELATED APPLICATIONS

This application claims priority to Taiwanese Application Serial Number 110141572 filed Nov. 8, 2021, which is herein incorporated by reference.

BACKGROUND

Technical Field

The present disclosure relates to camera lifting structures and display devices disposed with one of these camera lifting structures.

Description of Related Art

With the advancement of display technology, the current display devices are gradually developed to designs of borderless or narrow bezels and thinner bodies. Thus, only very limited space is left inside the display device for accommodating various components. Therefore, the components that take up more space inside the conventional display device, such as lifting cameras, have gradually failed to meet the needs of the thin display devices nowadays. Apart from being easy to interfere with internal circuit components during assembly, the conventional lifting cameras may also cause electromagnetic interference or poor heat dissipation due to the close distance to the internal circuit components.

As a result, how to design a new camera lifting structure to make the internal structure of the thin display device achieve a better space utilization is undoubtedly an important issue that the industry highly concerns.

SUMMARY

A technical aspect of the present disclosure is to provide a camera lifting structure, which can effectively reduce the dimension to be installed inside a display device, such that the inner space for usage of the display device can be effectively saved when the camera lifting structure is installed to the display device.

According to an embodiment of the present disclosure, a camera lifting structure includes a rail bracket, two fixing portions, two elastic elements, two sliding portions, two main connecting rods and a camera module. The rail bracket extends along a first direction and is configured to connect with a display device. The fixing portions are disposed on two opposite ends of the rail bracket along the first direction. The elastic elements are located between the fixing portions and extend along the first direction. Each of the elastic elements has a first end and a second end opposite to the first end. Each of the first ends connects with the corresponding fixing portion. The sliding portions are respectively connected with the corresponding second end and are configured to slide along the first direction relative to the rail bracket. Each of the main connecting rods has a third end and a fourth end opposite to the third end. Each of the third ends is pivotally connected with the corresponding sliding portion. The camera module is pivotally connected with the fourth ends and is configured to move along a second direction relative to the rail bracket. The second direction is perpendicular to the first direction.

In one or more embodiments of the present disclosure, the camera lifting structure further includes a guiding rod. The guiding rod is connected between the fixing portions along the first direction and penetrates through the elastic elements and the sliding portions.

In one or more embodiments of the present disclosure, the camera lifting structure further includes two protruding portions, a damping module and two auxiliary connecting rods. The protruding portions are respectively disposed on the corresponding main connecting rod and are located between the corresponding third end and the corresponding fourth end. The damping module includes a casing, two shafts, a cover and a plurality of protruding ridges. The casing is connected with the rail bracket and has two spaces therein. Each of the shafts includes a first shaft portion and a second shaft portion. Each of the first shaft portions and the corresponding second shaft portion extend along an axis. Each of the first shaft portions is located inside the corresponding space. The second shaft portions protrude outside the casing. The cover is connected with the casing to seal up the spaces. The protruding ridges are disposed on the first shaft portions and respectively extend along the corresponding axis. The protruding ridges are separated from each other. Each of the auxiliary connecting rods has a fifth end and a sixth end opposite to the fifth end. Each of the fifth ends is connected with the corresponding second shaft portion. Each of the auxiliary connecting rods has a slot extending between the corresponding fifth end and the corresponding sixth end. Each of the protruding portions is at least partially located inside the corresponding slot.

In one or more embodiments of the present disclosure, the damping module further includes two first limiting portions and two pairs of second limiting portions. The first limiting portions are respectively located on the corresponding first shaft portion. The two pairs of the second limiting portions are connected with the cover. Each pair of the second limiting portions is located inside the corresponding space. Each of the first limiting portions is limited between the corresponding pair of the second limiting portions.

In one or more embodiments of the present disclosure, the camera lifting structure further includes two buffering pads and a central portion. The buffering pads are located between the sliding portions and are respectively disposed on the corresponding sliding portion. The central portion is disposed on the rail bracket and is at least partially located between the buffering pads. The casing is at least partially located inside the central portion.

In one or more embodiments of the present disclosure, the camera lifting structure further includes a first buckling portion, a torsion spring and a second buckling portion. The first buckling portion is pivotally connected with the camera module. The torsion spring is elastically connected between the camera module and the first buckling portion. The second buckling portion is disposed on the central portion and is configured to mutually buckle with the first buckling portion.

In one or more embodiments of the present disclosure, the rail bracket includes a first subsidiary rail bracket and a second subsidiary rail bracket. The first subsidiary rail bracket has a first groove extending along the first direction. The second subsidiary rail bracket has a second groove extending along the first direction. The sliding portions are located between the first subsidiary rail bracket and the second subsidiary rail bracket. Each of the sliding portions includes a main body, a plurality of first rolling balls and a plurality of second rolling balls. The main body is connected with the corresponding second end. The first rolling balls are rotatably disposed on the main body and are configured to roll at the first groove. The second rolling balls are rotatably disposed on the main body and are configured to roll at the second groove.

In one or more embodiments of the present disclosure, a material of the main body is polyoxymethylene.

In one or more embodiments of the present disclosure, the camera module further includes a camera and an annular structure. The annular structure is connected with the camera along the second direction. The camera lifting structure further includes at least one cable. The cable is connected between the camera and the display device and passes through the annular structure.

In one or more embodiments of the present disclosure, the camera lifting structure further includes at least one washer. The washer is connected between the corresponding fixing portion and the corresponding elastic element.

A technical aspect of the present disclosure is to provide a display device, which can effectively reduce the dimension to of a camera lifting structure to be installed within its display housing, such that the inner space for usage of the display device can be effectively saved when the camera lifting structure is installed to the display device.

According to an embodiment of the present disclosure, a display device includes a display housing and a camera lifting structure. The display housing has an opening. The camera lifting structure is at least partially disposed within the display housing. The camera lifting structure includes a rail bracket, two fixing portions, two elastic elements, two sliding portions, two main connecting rods and a camera module. The rail bracket extends along a first direction. The fixing portions are disposed on two opposite ends of the rail bracket along the first direction. The elastic elements are located between the fixing portions and extending along the first direction. Each of the elastic elements has a first end and a second end opposite to the first end. Each of the first ends is connected with the corresponding fixing portion. The sliding portions are respectively connected with the corresponding second end and are configured to slide along the first direction relative to the rail bracket. Each of the main connecting rods has a third end and a fourth end opposite to the third end. Each of the third ends is pivotally connected with the corresponding sliding portion. The camera module is pivotally connected with the fourth ends and is configured to move along a second direction relative to the rail bracket to protrude outside the display housing through the opening. The second direction is perpendicular to the first direction.

In one or more embodiments of the present disclosure, the rail bracket connects with the display housing along the first direction.

In one or more embodiments of the present disclosure, the camera module is configured to move toward the rail bracket and pass through the opening until the camera module is fully accommodated within the display housing.

In one or more embodiments of the present disclosure, the camera lifting structure further includes two protruding portions, a damping module and two auxiliary connecting rods. The protruding portions are respectively disposed on the corresponding main connecting rod and are located between the corresponding third end and the corresponding fourth end. The damping module includes a casing, two shafts, a cover and a plurality of protruding ridges. The casing is connected with the rail bracket and has two spaces therein. Each of the shafts includes a first shaft portion and a second shaft portion. Each of the first shaft portions and the corresponding second shaft portion extend along an axis. Each of the first shaft portions is located inside the corresponding space. The second shaft portions protrude outside the casing. The cover is connected with the casing to seal up the spaces. The protruding ridges are disposed on the first shaft portions and respectively extend along the corresponding axis. The protruding ridges are separated from each other. Each of the auxiliary connecting rods has a fifth end and a sixth end opposite to the fifth end. Each of the fifth ends is connected with the corresponding second shaft portion. Each of the auxiliary connecting rods has a slot extending between the corresponding fifth end and the corresponding sixth end. Each of the protruding portions is at least partially located inside the corresponding slot.

In one or more embodiments of the present disclosure, the camera lifting structure further includes two first limiting portions and two pairs of second limiting portions. The first limiting portions are respectively located on the corresponding first shaft portion. The two pairs of the second limiting portions are connected with the cover. Each pair of the second limiting portions is located inside the corresponding space. Each of the first limiting portions is limited between the corresponding pair of the second limiting portions.

In one or more embodiments of the present disclosure, the camera lifting structure further includes two buffering pads and a central portion. The buffering pads are located between the sliding portions and are respectively disposed on the corresponding sliding portion. The central portion is disposed on the rail bracket and is at least partially located between the buffering pads. The casing is at least partially located inside the central portion.

In one or more embodiments of the present disclosure, the camera lifting structure further includes a first buckling portion, a torsion spring and a second buckling portion. The first buckling portion is pivotally connected with the camera module. The torsion spring is elastically connected between the camera module and the first buckling portion. The second buckling portion is disposed on the central portion and is configured to mutually buckle with the first buckling portion.

In one or more embodiments of the present disclosure, the rail bracket includes a first subsidiary rail bracket and a second subsidiary rail bracket. The first subsidiary rail bracket has a first groove extending along the first direction. The second subsidiary rail bracket has a second groove extending along the first direction. The sliding portions are located between the first subsidiary rail bracket and the second subsidiary rail bracket.

In one or more embodiments of the present disclosure, each of the sliding portions includes a main body, a plurality of first rolling balls and a plurality of second rolling balls. The main body is connected with the corresponding second end. The first rolling balls are rotatably disposed on the main body and are configured to roll at the first groove. The second rolling balls rotatably disposed on the main body and are configured to roll at the second groove.

In one or more embodiments of the present disclosure, the camera module further includes a camera and an annular structure. The annular structure is connected with the camera along the second direction. The display device further includes at least one cable. The cable is connected with the camera and passes through the annular structure.

The above-mentioned embodiments of the present disclosure have at least the following advantages:
  (1) Since the movement of camera module towards or away from the rail bracket along the second direction to switch between the accommodated state and the operation state, corresponds to the sliding of the sliding portions along the first direction and the compression and extension of the elastic elements along the first direction, the dimension of the camera lifting structure disposed within the display housing of the display device along the second direction can be effectively reduced. As a result, when the camera lifting structure is installed within the display housing of the display device, the inner space for usage of the display device can be effectively saved. Moreover, damage of the camera lifting structure due to contact with other internal components can be avoided.

(2) When the main connecting rods rotate relative to the camera module and the sliding portions, the protruding portions at least partially located inside the slots of the auxiliary connecting rods are also moved inside the slots of the auxiliary connecting rods with respect to the rotation of the main connecting rods, such that the auxiliary connecting rods also rotate relative to the damping module. Since the damping module provides damping to the rotation of the auxiliary connecting rods, the rotation of the main connecting rods relative to the camera module and the sliding portions is also influenced by the damping effect. In this way, the speed at which the sliding portions slide towards each other or towards the fixing portions along the first direction and the speed at which the camera module moves towards or away from the rail bracket along the second direction are under control, and the movement of the camera module towards or away from the rail bracket along the second direction also becomes more stable.

(3) Since the cables pass through the annular structure and are protected by the annular structure, when the camera module moves along the second direction relative to the rail bracket, the cables connected between the camera and the display device will not entangle with or tug on other components of the display device or the camera lifting structure. Thus, damage or even fracture of the cables can be avoided.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
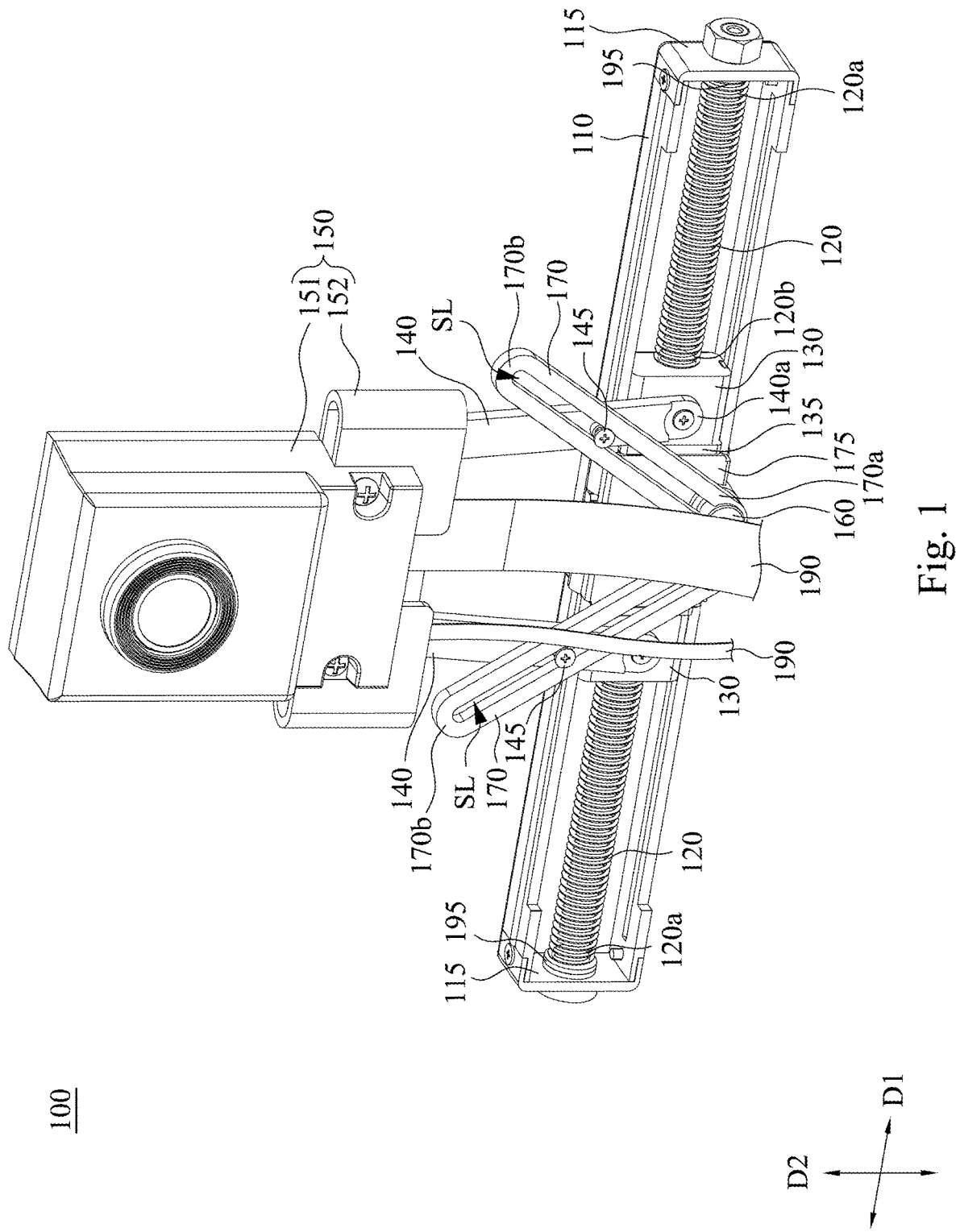
FIG. 1 is a schematic front view of a camera lifting structure according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
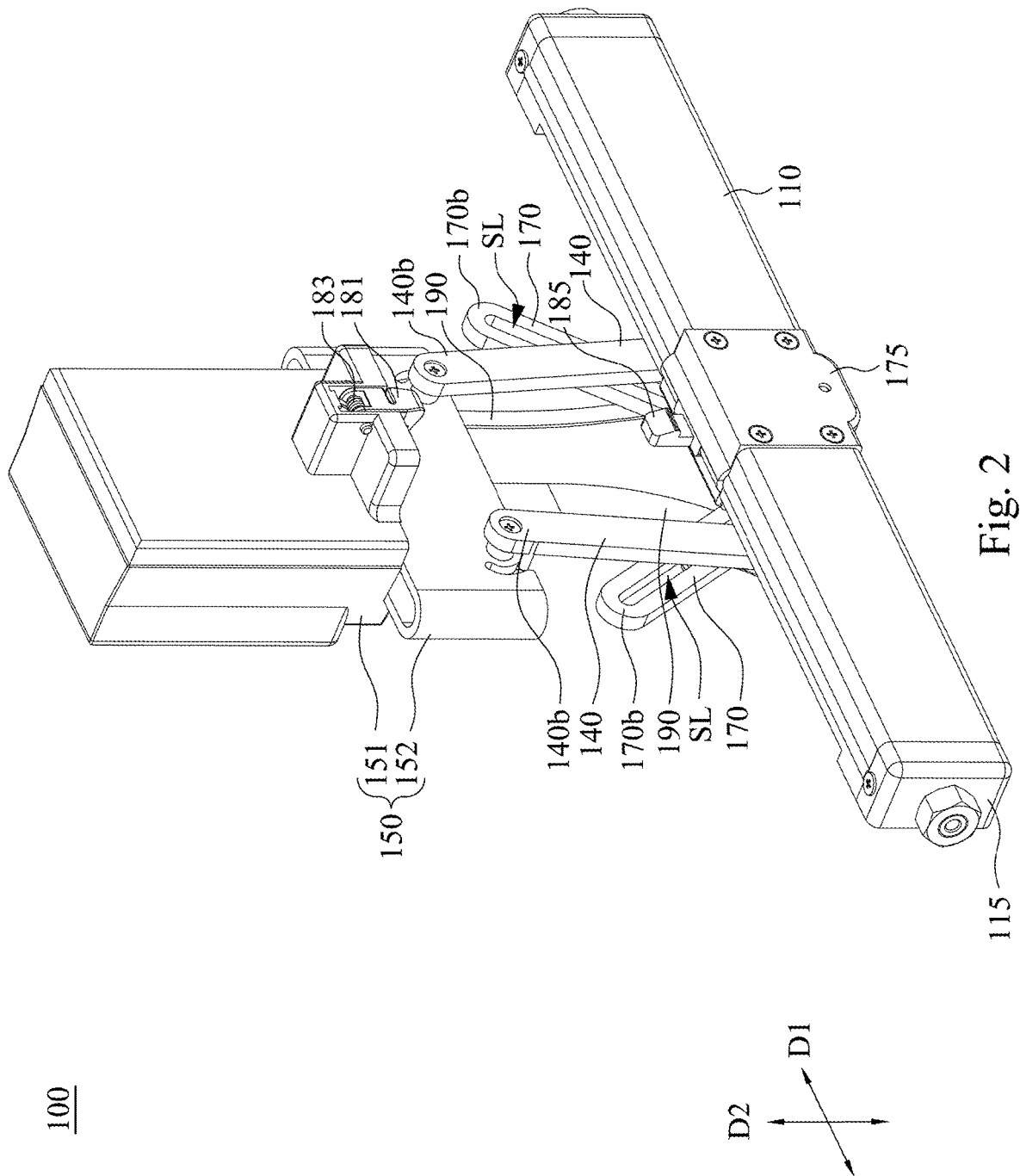
FIG. 2 is a schematic back view of the camera lifting structure of FIG. 1.
Figure 3:
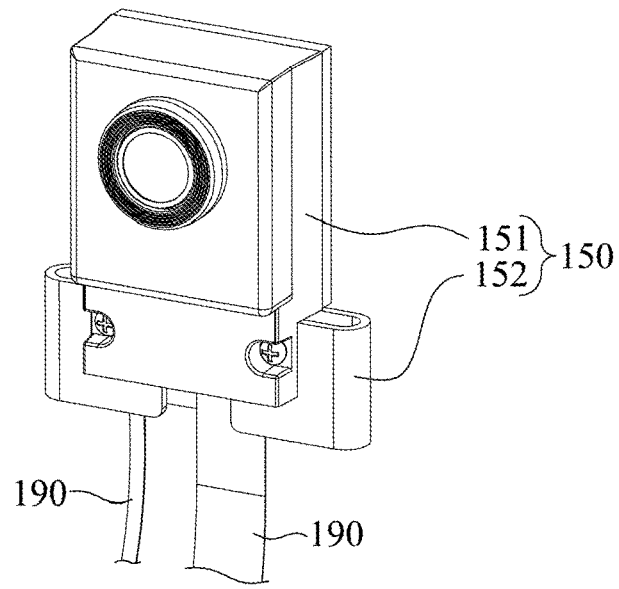
FIG. 3 is an exploded view of the camera lifting structure of FIG. 1.
Figure 3:
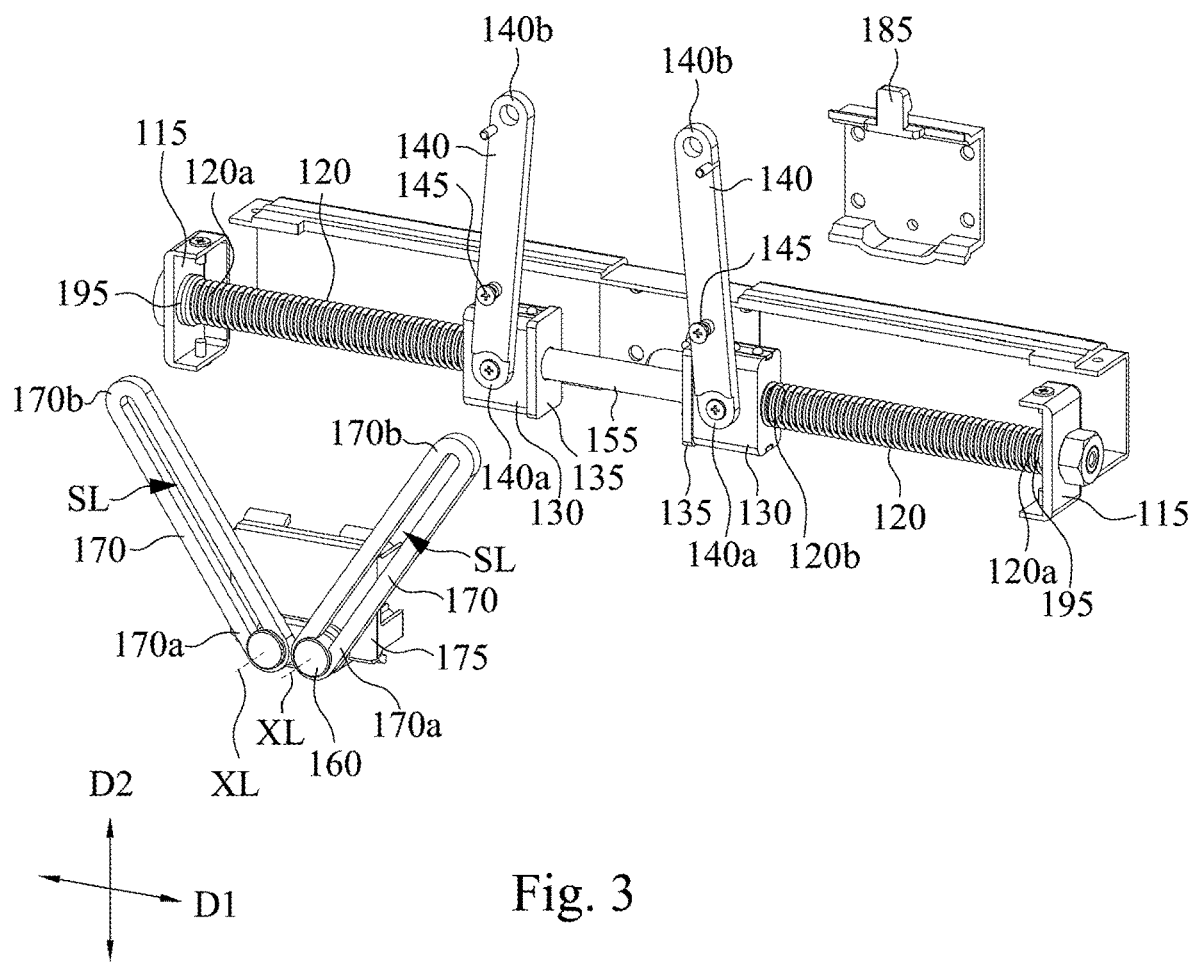

Reference is made to FIGS. 1-3. FIG. 1 is a schematic front view of a camera lifting structure 100 according to an embodiment of the present disclosure. FIG. 2 is a schematic back view of the camera lifting structure 100 of FIG. 1. FIG. 3 is an exploded view of the camera lifting structure 100 of FIG. 1. In this embodiment, as shown in FIGS. 1-3, a camera lifting structure 100 includes a rail bracket 110, two fixing portions 115, two elastic elements 120, two sliding portions 130, two main connecting rods 140 and a camera module 150. The rail bracket 110 extends along a first direction D1 and is configured to connect with a display device 200 (please see FIGS. 4-5 and 15). The fixing portions 115 are disposed on two opposite ends of the rail bracket 110 along the first direction D1. The elastic elements 120 are located between the fixing portions 115 and extend along the first direction D1. To be specific, each of the elastic elements 120 can be a spring. However, this does not intend to limit the present disclosure. Moreover, each of the elastic elements 120 has a first end 120a and a second end 120b opposite to the first end 120a. The first end 120a of each of the elastic elements 120 is connected with the corresponding fixing portion 115. The sliding portions 130 are respectively connected with the corresponding second end 120b of each of the elastic elements 120 and are configured to slide along the first direction D1 relative to the rail bracket 110 with the elasticity of the elastic elements 120. In some embodiments, the rail bracket 110 forms the guiding rail and the sliding portions 130 are movable along the guiding rail. Each of the main connecting rods 140 has a third end 140a and a fourth end 140b opposite to the third end 140a. The third end 140a of each of the main connecting rods 140 is pivotally connected with the corresponding sliding portion 130. The camera module 150 is pivotally connected with the fourth ends 140b of the main connecting rods 140 and is configured to move along a second direction D2 relative to the rail bracket 110 under the action of the main connecting rods 140. The second direction D2 is perpendicular to the first direction D1.

Structurally speaking, as shown in FIG. 3, the camera lifting structure 100 further includes a guiding rod 155. The guiding rod 155 is connected between the fixing portions 115 along the first direction D1 and penetrates through the elastic elements 120 and the sliding portions 130. Therefore, the sliding portions 130 slides relative to the rail bracket 110 along the guiding rod 155. In this way, the sliding portions 130 and the elastic elements 120 will not detach from the rail bracket 110.

In addition, in this embodiment, the camera lifting structure 100 further includes at least one washer 195. As shown in FIGS. 1 and 3, the washer 195 is connected between the corresponding fixing portion 115 and the corresponding elastic element 120. By modifying the size, quantity or material of the washers 195, the elastic potential energy of the elastic elements 120 can be adjusted according to the actual situations.

Furthermore, in this embodiment, as shown in FIGS. 1-3, the camera module 150 further includes a camera 151 and an annular structure 152. The camera 151 is configured to capture images. The annular structure 152 is connected with the camera 151 along the second direction D2. In addition, the camera lifting structure 100 further includes at least one cable 190. The cable 190 passes through the annular structure 152 and is connected between the camera 151 and the display device 200 (please see FIGS. 4-5 and 15). For example, the cable 190 is connected with a mainboard (not shown) of the display device 200. Moreover, for example, as shown in FIGS. 1-3, the camera lifting structure 100 includes two cables 190. In practice, the two cables 190 can be respectively an electric cable or a flexible flat cable (FFC). However, this does not intend to limit the present disclosure.

The cables 190 pass through the annular structure 152 and are protected by the annular structure 152. Therefore, when the camera module 150 moves along the second direction D2 relative to the rail bracket 110, the cables 190 connected between the camera 151 and the display device 200 will not entangle with or tug on other components of the display device 200 or the camera lifting structure 100 and damages or even fractures on the cables 190 can be avoided. Moreover, the annular structure 152 can be of a complete ring or a partial ring. However, this does not intend to limit the present disclosure.

In this embodiment, as shown in FIGS. 1-3, the camera lifting structure 100 further includes two buffering pads 135 and a central portion 175. The buffering pads 135 are located between the sliding portions 130 and are respectively disposed on the corresponding sliding portion 130. The central portion 175 is disposed on the rail bracket 110 and is at least partially located between the buffering pads 135. Thus, when the sliding portions 130 slide towards each other relative to the rail bracket 110 and reach the central portion 175, the buffering pads 135 disposed on the sliding portions 130 will abut against the central portion 175 and act as a buffer against the impact to the central portion 175 by the sliding portions 130. In this way, when the movements of the sliding portions 130 are stopped by the central portion 175, the buffering pads 135 of the sliding portions 130 abut against the central portion 175 and absorb the impact therebetween, therefore the sound of impact due to the collision of the sliding portions 130 to the central portion 175 can be effectively avoided by the buffering pads 135.

Figure 4:
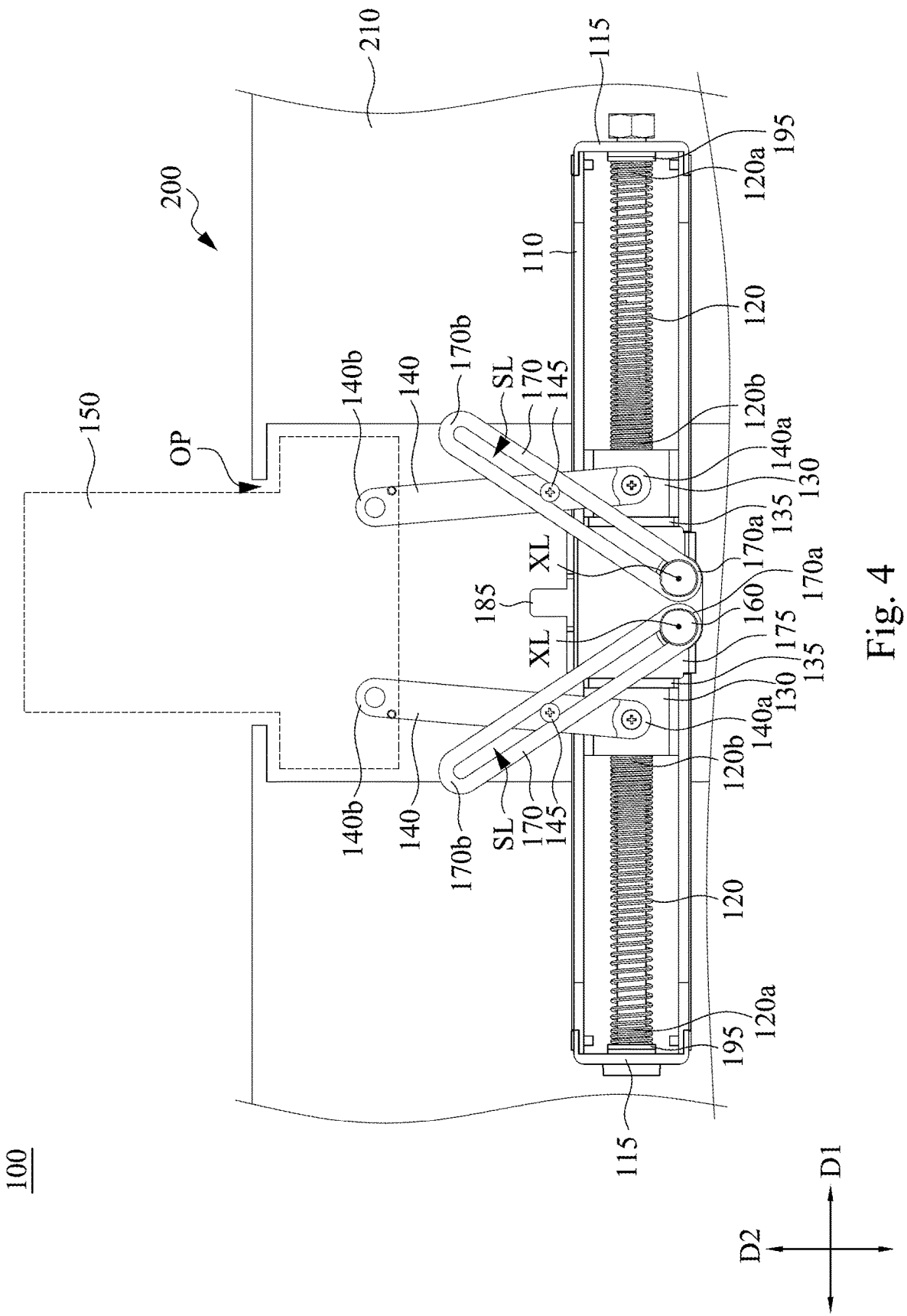
FIG. 4 is a front view of the camera lifting structure of FIG. 1, in which the camera module at least partially protrudes outside the display device.
Figure 5:
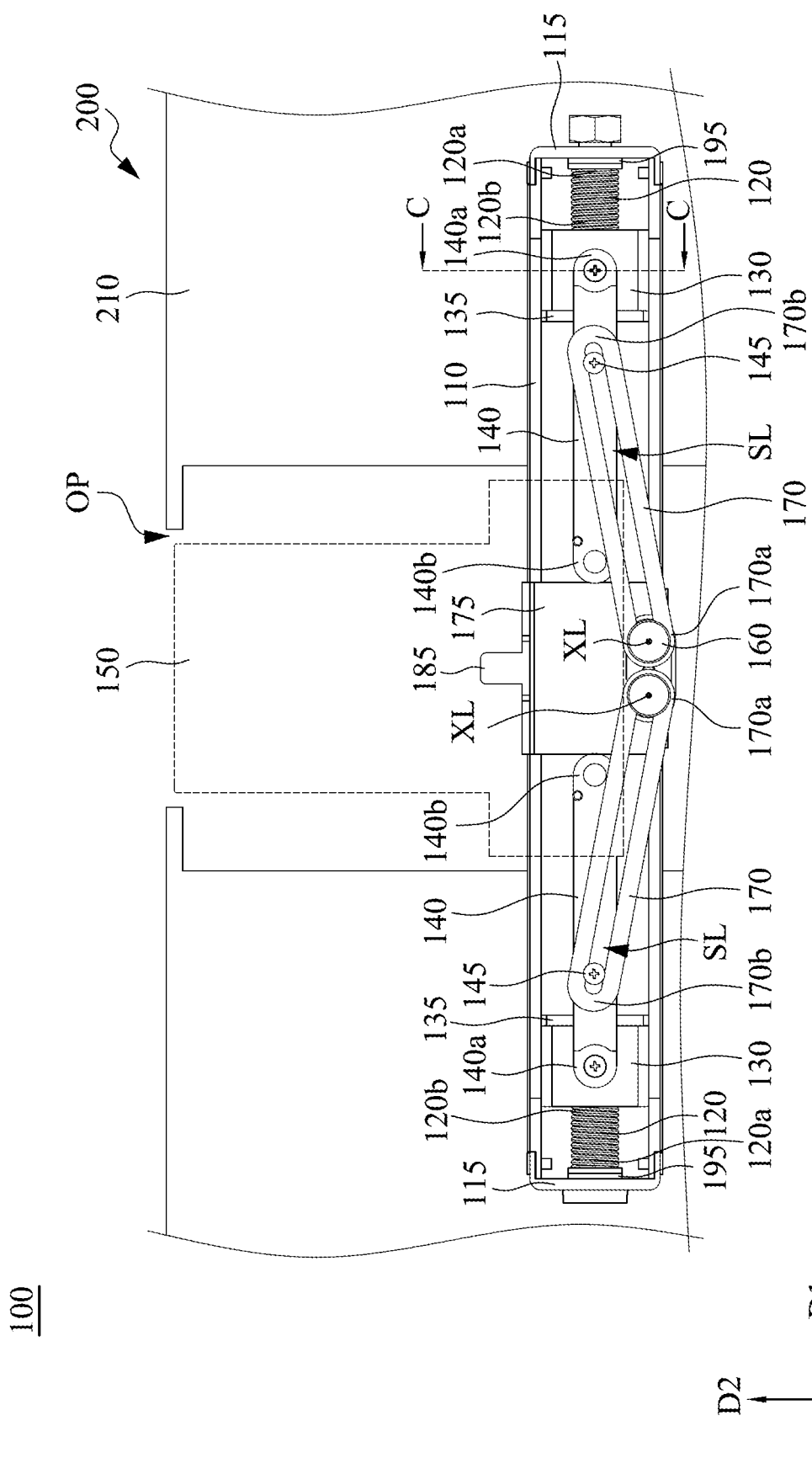
FIG. 5 is a front view of the camera lifting structure of FIG. 1, in which the camera module is fully accommodated in the display device.

Reference is made to FIGS. 4-5. FIG. 4 is a front view of the camera lifting structure 100 of FIG. 1, in which the camera module 150 at least partially protrudes outside the display device 200. FIG. 5 is a front view of the camera lifting structure 100 of FIG. 1, in which the camera module 150 is fully accommodated in the display device 200. For the sake of drawing simplification, in FIGS. 4-5, the shape of the camera module 150 is only presented in hidden lines, and the cables 190 are not shown. In this embodiment, as shown in FIGS. 4-5, the display device 200 includes the camera lifting structure 100 and a display housing 210. The display housing 210 has an opening OP. The camera lifting structure 100 is at least partially disposed within the display housing 210 of the display device 200. To be specific, the rail bracket 110 of the camera lifting structure 100 is connected with the display housing 210 while the rail bracket 110 extends along the first direction D1. Moreover, the camera lifting structure 100 can be switched between an operation state and an accommodated state. As shown in FIG. 4, the camera module 150 is in the operation state that the camera 151 of the camera module 150 at least partially protrudes outside the display housing 210 of the display device 200 through the opening OP of the display housing 210 and can operate to take images. As shown in FIG. 5, the camera module 150 is in the accommodated state that the camera module 150 is fully accommodated in the display device 200 when it is no longer required to take images.

To be specific, as shown in FIGS. 1-5, the camera lifting structure 100 further includes two protruding portions 145, a damping module 160 and two auxiliary connecting rods 170. The protruding portions 145 are respectively disposed on the corresponding main connecting rod 140 and are located between the corresponding third end 140a and the corresponding fourth end 140b. Each of the auxiliary connecting rods 170 has a fifth end 170a and a sixth end 170b opposite to the fifth end 170a. The fifth end 170a of each of the auxiliary connecting rods 170 is connected with the damping module 160. The damping module 160 provides damping to the rotation of the auxiliary connecting rods 170. It is worth to note that, each of the auxiliary connecting rods 170 has a slot SL extending between the corresponding fifth end 170a and the corresponding sixth end 170b. Each of the protruding portions 145 is at least partially located inside the corresponding slot SL.

When the camera lifting structure 100 is switched from the operation state (as shown in FIG. 4) to the accommodated state (as shown in FIG. 5), the camera module 150 is pressed by the user, such that the camera module 150 moves downwardly toward the rail bracket 110 along the second direction D2. When the camera module 150 moves towards the rail bracket 110 along the second direction D2, the main connecting rods 140 rotate relative to the camera module 150 and the sliding portions 130 as the third end 140a and the fourth end 140b of each of the main connecting rods 140 are respectively and pivotally connected with the corresponding sliding portion 130 and the camera module 150, such that the sliding portions 130 are pushed to slide towards the fixing portions 115 along the first direction D1. In this way, the elastic elements 120 are compressed and the amount of elastic potential energy stored in the elastic elements 120 is increased until the camera lifting structure 100 is completely switched to the accommodated state.

Furthermore, as mentioned above, the protruding portions 145 disposed on the main connecting rods 140 are at least partially located inside the slots SL of the auxiliary connecting rods 170. Therefore, when the main connecting rods 140 rotate relative to the camera module 150 and the sliding portions 130, the protruding portions 145 also move along the inside of the slots SL of the auxiliary connecting rods 170 with respect to the rotation of the main connecting rods 140, such that the auxiliary connecting rods 170 also rotate relative to the damping module 160. Since the damping module 160 provides damping to the rotation of the auxiliary connecting rods 170, the rotation of the main connecting rods 140 relative to the camera module 150 and the sliding portions 130 is also influenced by the damping effect. In this way, both of the speed at which the sliding portions 130 slide towards the fixing portions 115 along the first direction D1 and the speed at which the camera module 150 moves towards the rail bracket 110 along the second direction D2 are varied in a controlled manner, and the movement of the camera module 150 towards the rail bracket 110 along the second direction D2 also becomes more stable.

When the camera lifting structure 100 is switched from the accommodated state (as shown in FIG. 5) to the operation state (as shown in FIG. 4), the elastic potential energy stored in the elastic elements 120 is released, such that the elastic elements 120 extend elastically, which makes the sliding portions 130 slide towards each other relative to the rail bracket 110. Since the third end 140a and the fourth end 140b of each of the main connecting rods 140 are respectively and pivotally connected with the corresponding sliding portion 130 and the camera module 150, the main connecting rods 140 rotate relative to the camera module 150 and the sliding portions 130, and the camera module 150 is pushed to move upwardly away from the rail bracket 110 along the second direction D2, until the camera lifting structure 100 is completely switched to the operation state.

Furthermore, as mentioned above, the protruding portions 145 disposed on the main connecting rods 140 are at least partially located inside the slots SL of the auxiliary connecting rods 170. Therefore, when the main connecting rods 140 rotate relative to the camera module 150 and the sliding portions 130, the protruding portions 145 are also moved along the inside of the slots SL of the auxiliary connecting rods 170 with respect to the rotation of the main connecting rods 140, such that the auxiliary connecting rods 170 also rotate relative to the damping module 160. Since the damping module 160 provides damping to the rotation of the auxiliary connecting rods 170, the rotation of the main connecting rods 140 relative to the camera module 150 and the sliding portions 130 is also influenced by the damping effect. In this way, both of the speed at which the sliding portions 130 slide towards each other and the speed at which the camera module 150 moves away from the rail bracket 110 along the second direction D2 are varied in a controlled manner, and the movement of the camera module 150 away from the rail bracket 110 along the second direction D2 also becomes more stable.

Figure 6:
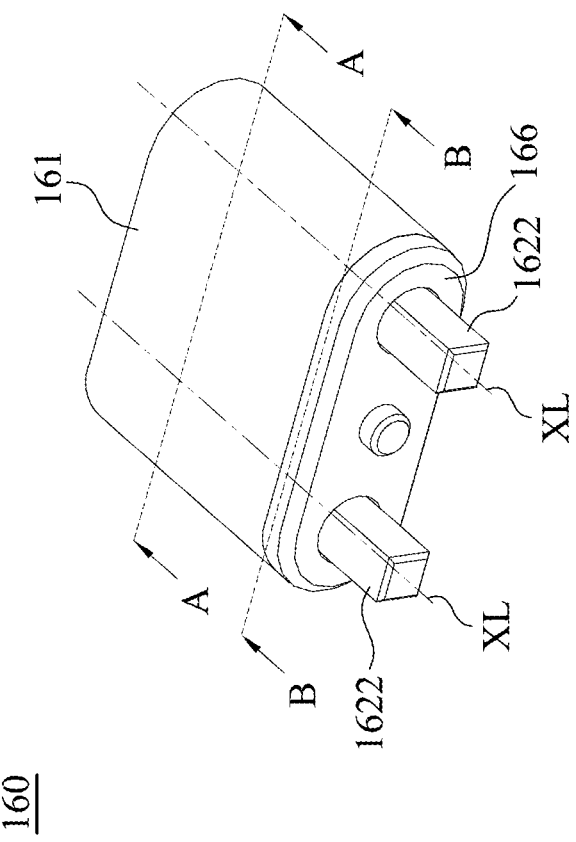
FIG. 6 is an enlarged schematic view of the damping module of FIG. 4.
Figure 7:
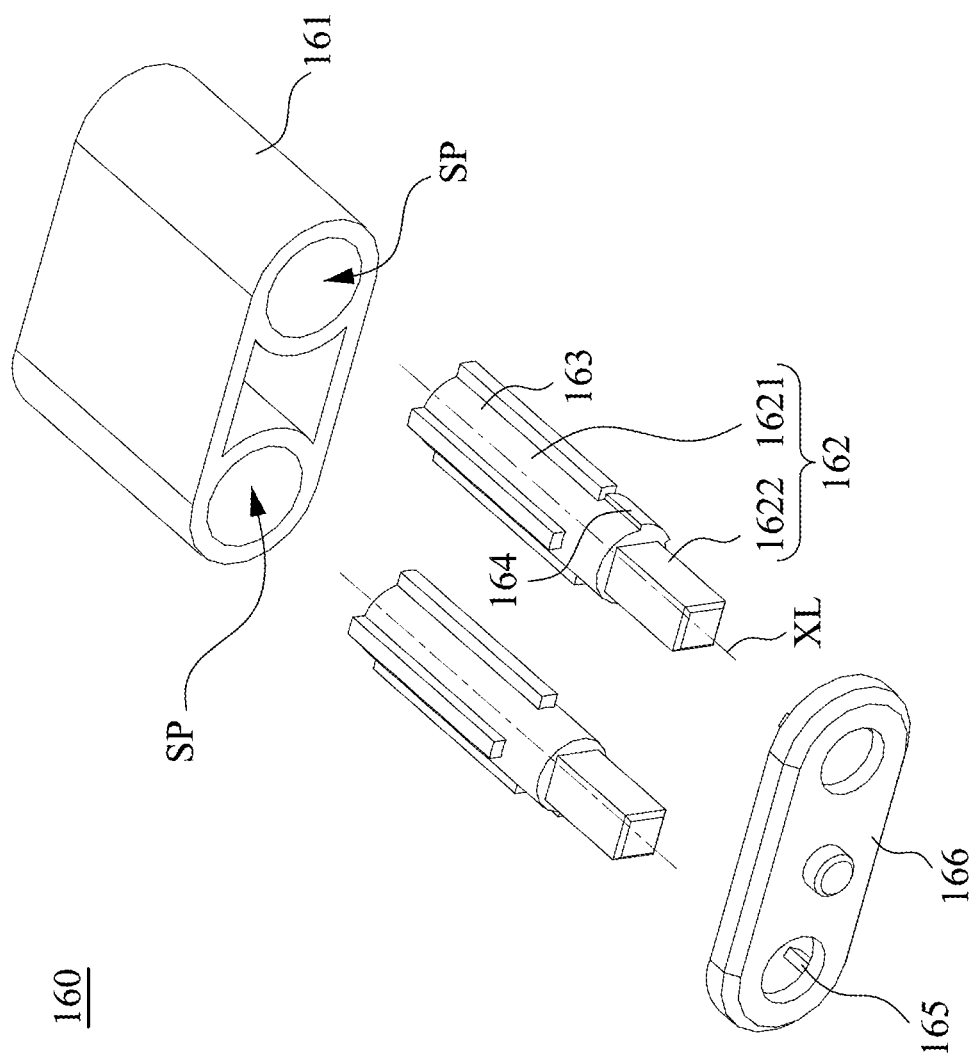
FIG. 7 is an exploded view of the damping module of FIG. 6.
Figure 8:
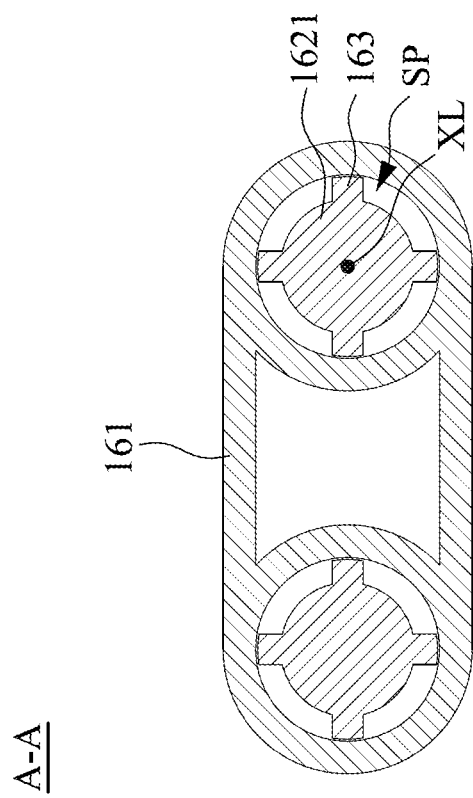
FIG. 8 is a cross-sectional view along the sectional line A-A of FIG. 6.

Reference is made to FIGS. 6-8. FIG. 6 is an enlarged schematic view of the damping module 160 of FIG. 4. FIG. 7 is an exploded view of the damping module 160 of FIG. 6. FIG. 8 is a cross-sectional view along the sectional line A-A of FIG. 6. In this embodiment, as shown in FIGS. 6-8, the damping module 160 includes a casing 161, two shafts 162 and a plurality of protruding ridges 163. The casing 161 is connected with the rail bracket 110 and is at least partially located inside the central portion 175. The casing 161 has two spaces SP therein. Each of the shafts 162 includes a first shaft portion 1621 and a second shaft portion 1622. Each of the first shaft portions 1621 and the corresponding second shaft portion 1622 extend along an axis XL. Each of the first shaft portions 1621 is located inside the corresponding space SP. The second shaft portions 1622 protrude outside the casing 161. The fifth end 170a of each of the auxiliary connecting rods 170 is connected with the corresponding second shaft portion 1622. Thus, the shafts 162 can rotate relative to the casing 161 with respect to the rotation of the auxiliary connecting rods 170. The protruding ridges 163 are disposed on the first shaft portions 1621 and respectively extend along the corresponding axis XL. The protruding ridges 163 are separated from each other. Therefore, when the spaces SP of the casing 161 are filled up with oil or other damping fluid, the viscosity of the oil in the spaces SP causes resistance to the protruding ridges 163 during rotation, which provides damping to the rotations of the shafts 162. In this embodiment, the damping module 160 further includes a cover 166. The cover 166 is connected with the casing 161 to seal up the spaces SP.

Figure 9:
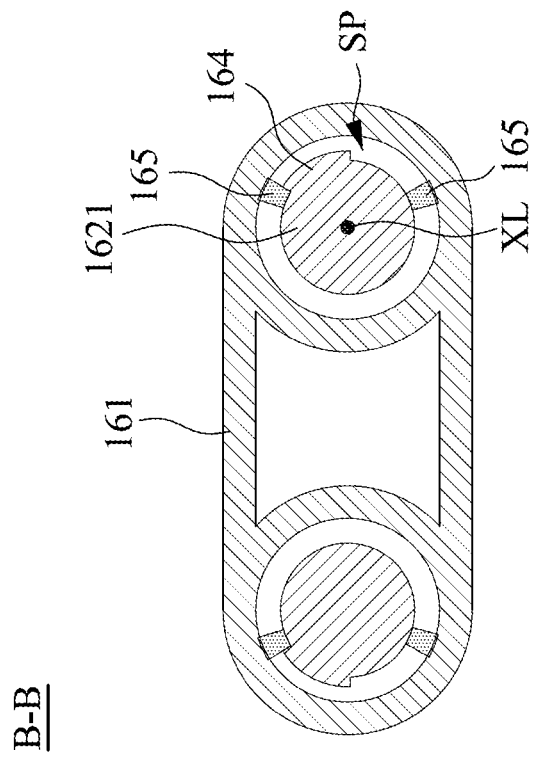
FIG. 9 is a cross-sectional view along the sectional line B-B of FIG. 6.

Reference is made to FIG. 9. FIG. 9 is a cross-sectional view along the sectional line B-B of FIG. 6. In this embodiment, as shown in FIG. 9, the damping module 160 further includes two first limiting portions 164 and two pairs of second limiting portions 165. The first limiting portions 164 are respectively located on the corresponding first shaft portion 1621. As shown in FIG. 9, each pair of the second limiting portions 165 is located inside the corresponding space SP, and is connected with the cover 166 as shown in FIG. 7. In this embodiment, each of the first limiting portions 164 is limited between the corresponding pair of the second limiting portions 165. In other words, the rotation of the shafts 162 relative to the casing 161 is limited by being stopped by the second limiting portions 165.

Figure 10:
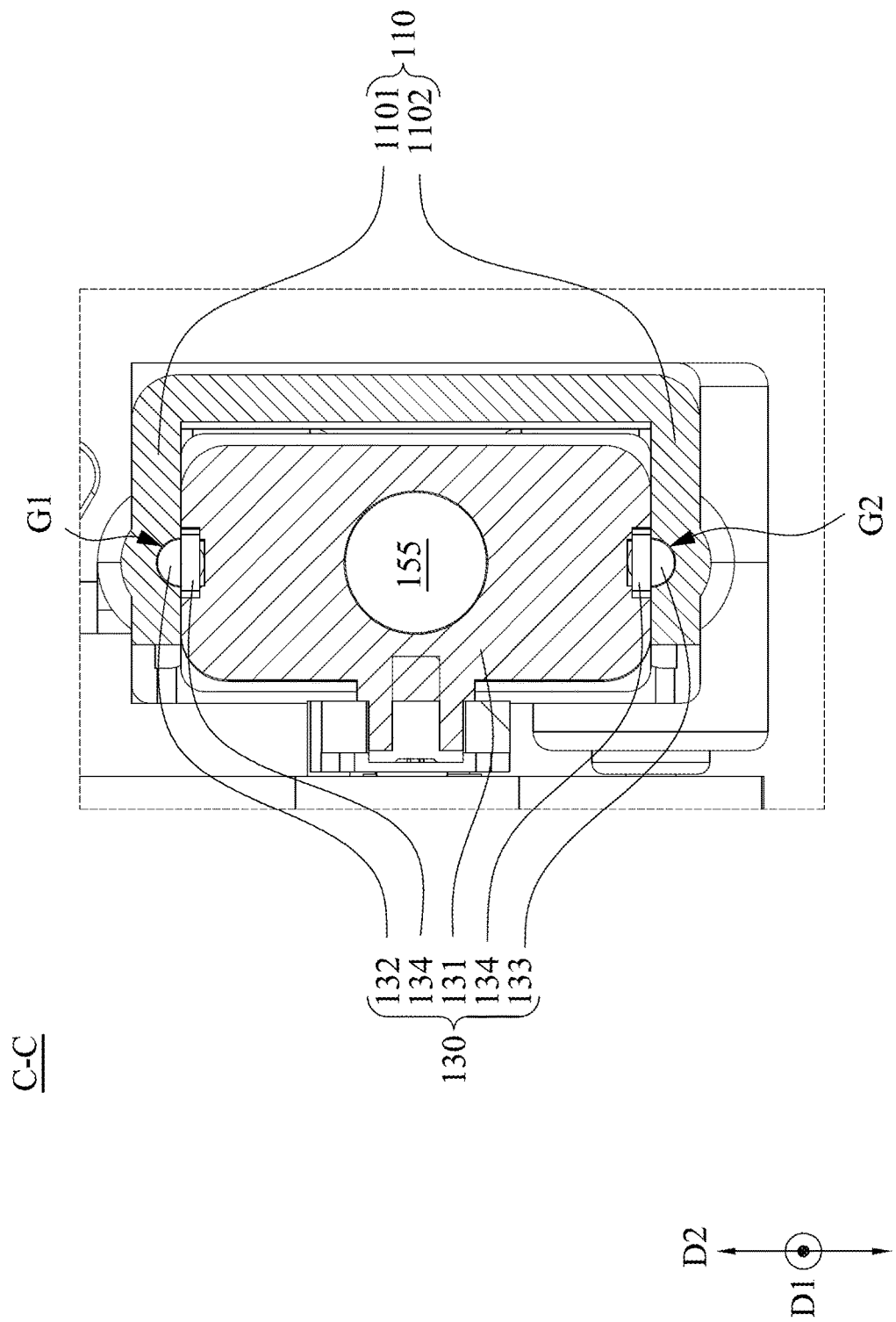
FIG. 10 is a cross-sectional view along the sectional line C-C of FIG. 5.
Figure 11:
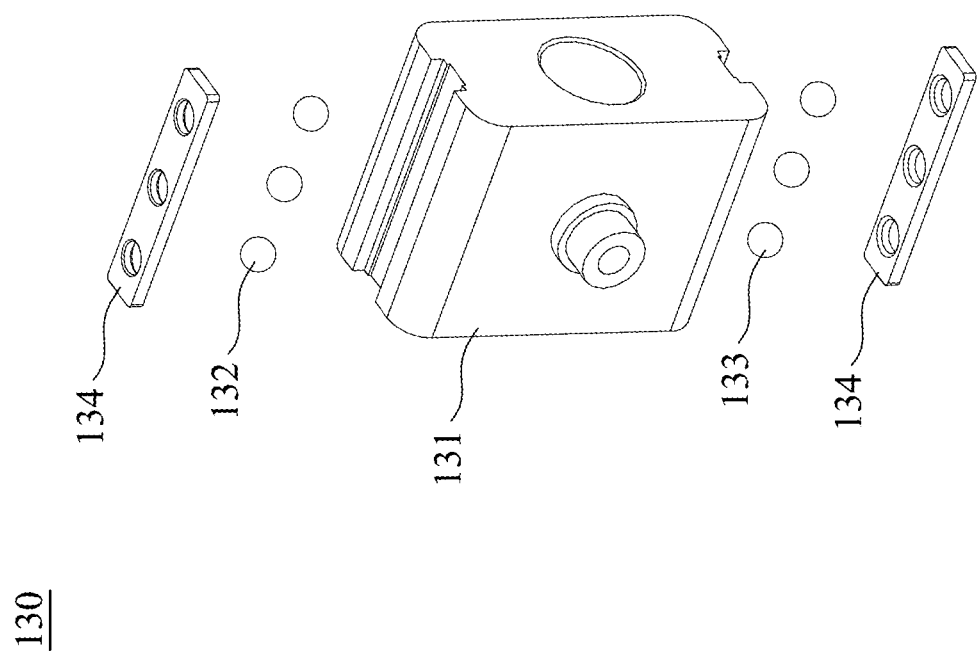
FIG. 11 is an exploded view of the sliding portion of FIG. 10.

Reference is made to FIGS. 10-11. FIG. 10 is a cross-sectional view along the sectional line C-C of FIG. 5. FIG. 11 is an exploded view of the sliding portion 130 of FIG. 10. In this embodiment, as shown in FIGS. 10-11, the rail bracket 110 includes a first subsidiary rail bracket 1101 and a second subsidiary rail bracket 1102. The first subsidiary rail bracket 1101 has a first groove G1 extending along the first direction D1. The second subsidiary rail bracket 1102 has a second groove G2 extending along the first direction D1. The sliding portions 130 are located between the first subsidiary rail bracket 1101 and the second subsidiary rail bracket 1102. Each of the sliding portions 130 includes a main body 131, a plurality of first rolling balls 132 and a plurality of second rolling balls 133. The main body 131 is connected with the corresponding second end 120b. The first rolling balls 132 are rotatably disposed on the main body 131 and are configured to roll at the first groove G1. The second rolling balls 133 are rotatably disposed on the main body 131 and are configured to roll at the second groove G2. In the embodiments, as shown in exemplary FIG. 11, the first rolling balls 132 and the second rolling balls 133 can be disposed in the holes of the plates 134 on both sides of the main body 131. However, this does not intend to limit the present disclosure.

In practical applications, a material of the main body 131 can be chosen to have a stable dimension and be resistant to wearing, such as polyoxymethylene (POM). However, this does not intend to limit the present disclosure.

Figure 12:
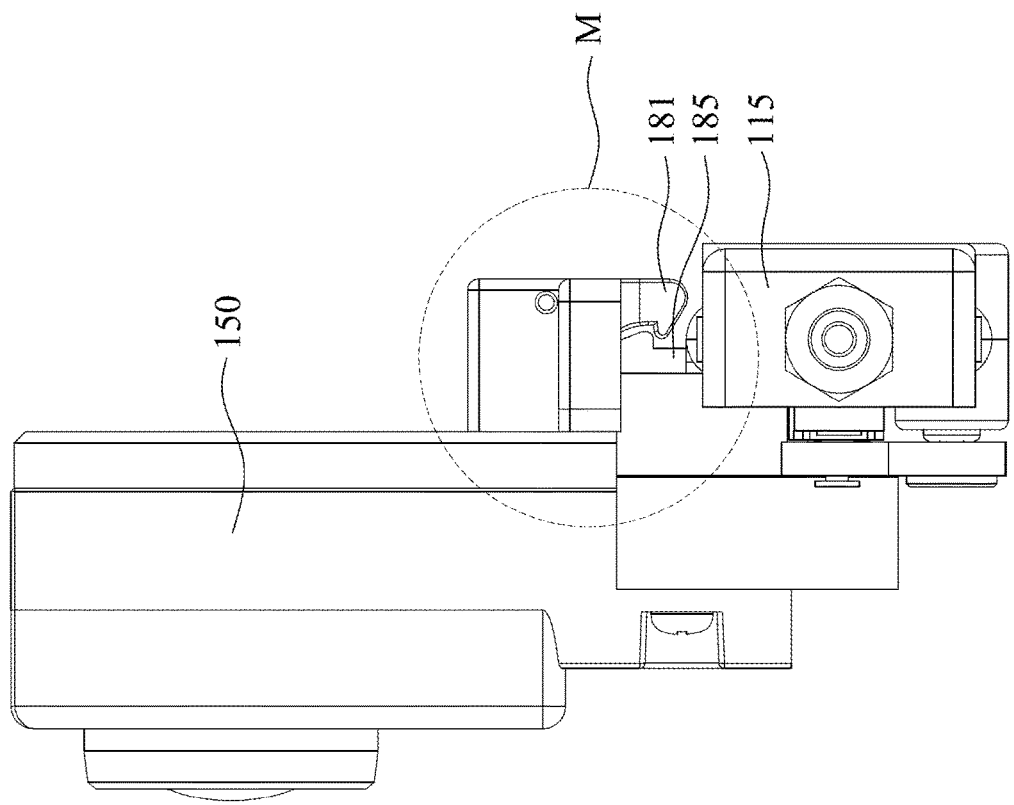
FIG. 12 is a side view of the camera lifting structure of FIG. 1.
Figure 13:
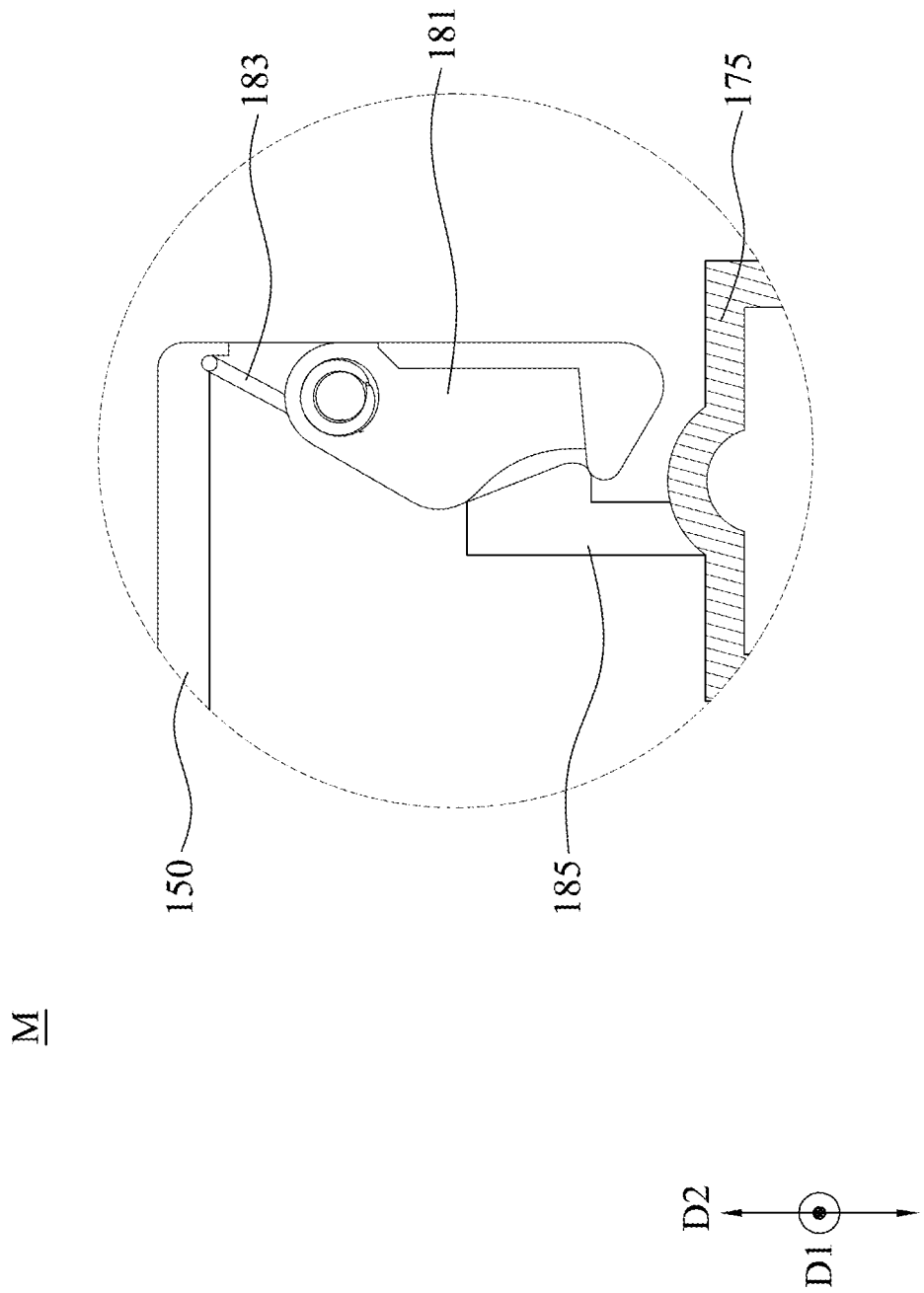
FIG. 13 is a locally enlarged perspective view of area M of FIG. 12, in which the first buckling portion is mutually buckled with the second buckling portion.

Reference is made to FIGS. 12-13. FIG. 12 is a side view of the camera lifting structure 100 of FIG. 1. FIG. 13 is a locally enlarged perspective view of area M of FIG. 12, in which the first buckling portion 181 is mutually buckled with the second buckling portion 185. In this embodiment, as shown in FIGS. 12-13, the camera lifting structure 100 further includes a first buckling portion 181, a torsion spring 183 and a second buckling portion 185. The first buckling portion 181 is pivotally connected with the camera module 150. The torsion spring 183 is elastically connected between the camera module 150 and the first buckling portion 181. The second buckling portion 185 is disposed on the central portion 175 and is configured to mutually buckle with the first buckling portion 181. When the first buckling portion 181 is mutually buckled with the second buckling portion 185, the camera module 150 cannot move upwardly or downwardly relative to the rail bracket 110, and the camera lifting structure 100 is fully accommodated inside the display device 200, such that the camera lifting structure 100 is in the accommodated state.

Figure 14:
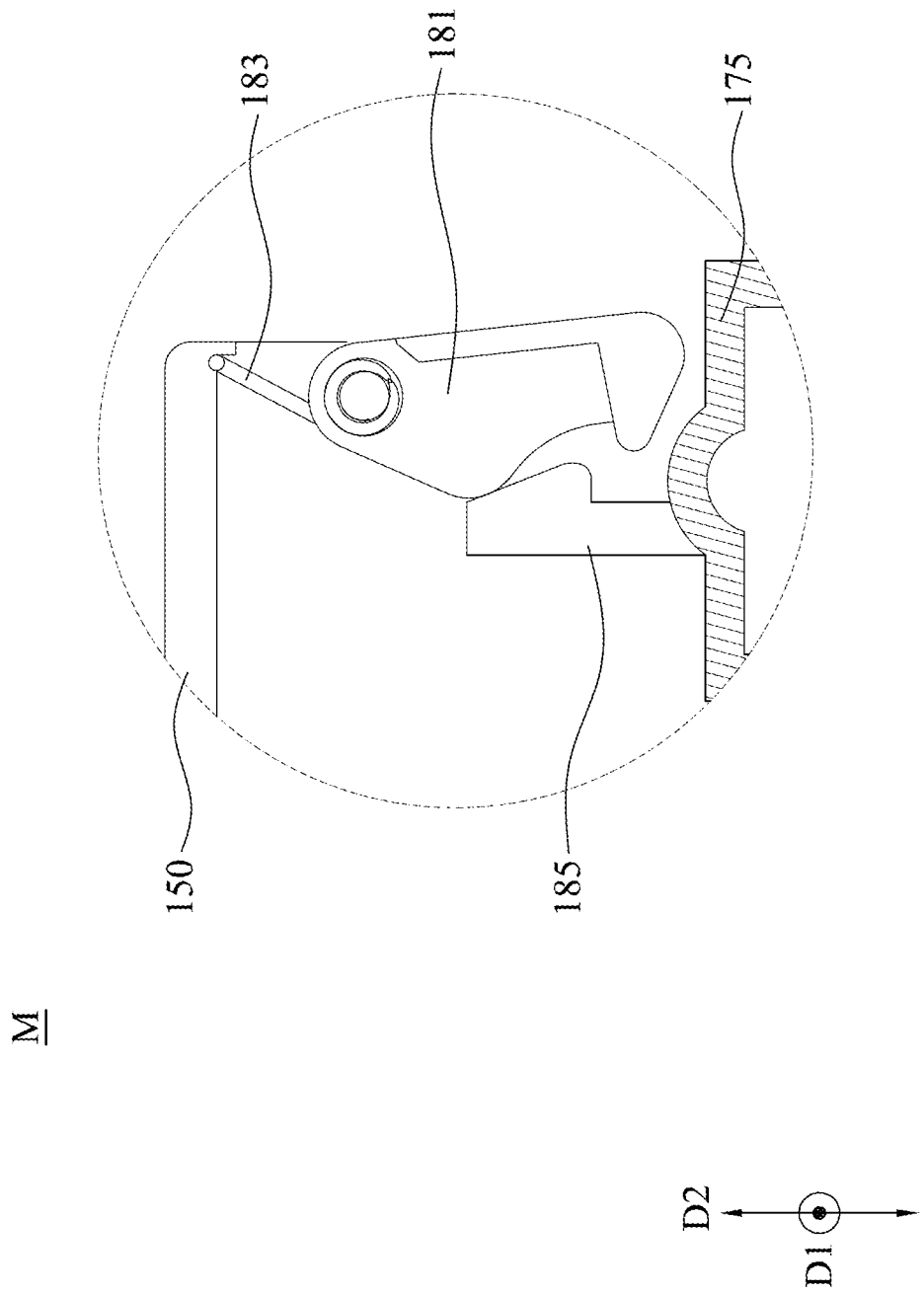
FIG. 14 is a locally enlarged perspective view of area M of FIG. 12, in which the first buckling portion is already detached from the second buckling portion.

Reference is made to FIG. 14. FIG. 14 is a locally enlarged perspective view of area M of FIG. 12, in which the first buckling portion 181 is already detached from the second buckling portion 185. When the camera lifting structure 100 is in the accommodated state (as shown in FIG. 5), the camera lifting structure 100 switches to the operation state (as shown in FIG. 4) after the user presses the camera module 150 towards the rail bracket 110. In this embodiment, as shown in FIG. 14, the camera module 150 is pressed towards the rail bracket 110 and part of the first buckling portion 181 abuts against the second buckling portion 185, which makes the first buckling portion 181 elastically rotate relative to the camera module 150, such that the first buckling portion 181 is detached from the second buckling portion 185. At this point, the elastic potential energy stored in the elastic elements 120 is released, such that the elastic elements 120 extend elastically, which make the sliding portions 130 slide towards each other relative to the rail bracket 110. The sliding portions 130 are then stopped by the central portion 175 and the buffering pads 135 of the sliding portions 130 abut against the central portion 175. The movements of the sliding portions 130 make the camera 151 at least partially protrude outside the display housing 210 of the display device 200 through the opening OP of the display housing 210. The camera lifting structure 100 completely switches to the operation state that the camera 151 can take images.

On the contrary, when the camera lifting structure 100 is in the operation state (as shown in FIG. 4), the camera lifting structure 100 switches to the accommodated state (as shown in FIG. 5) after the user presses on the camera module 150 towards the rail bracket 110 along the second direction D2 through the opening OP of the display housing 210. The camera module 150 moves downwardly until the first buckling portion 181 is mutually buckled with the second buckling portion 185, and the camera lifting structure 100 is fully accommodated inside the display device 200. At this point, the camera lifting structure 100 is in the accommodated state.

Figure 15:
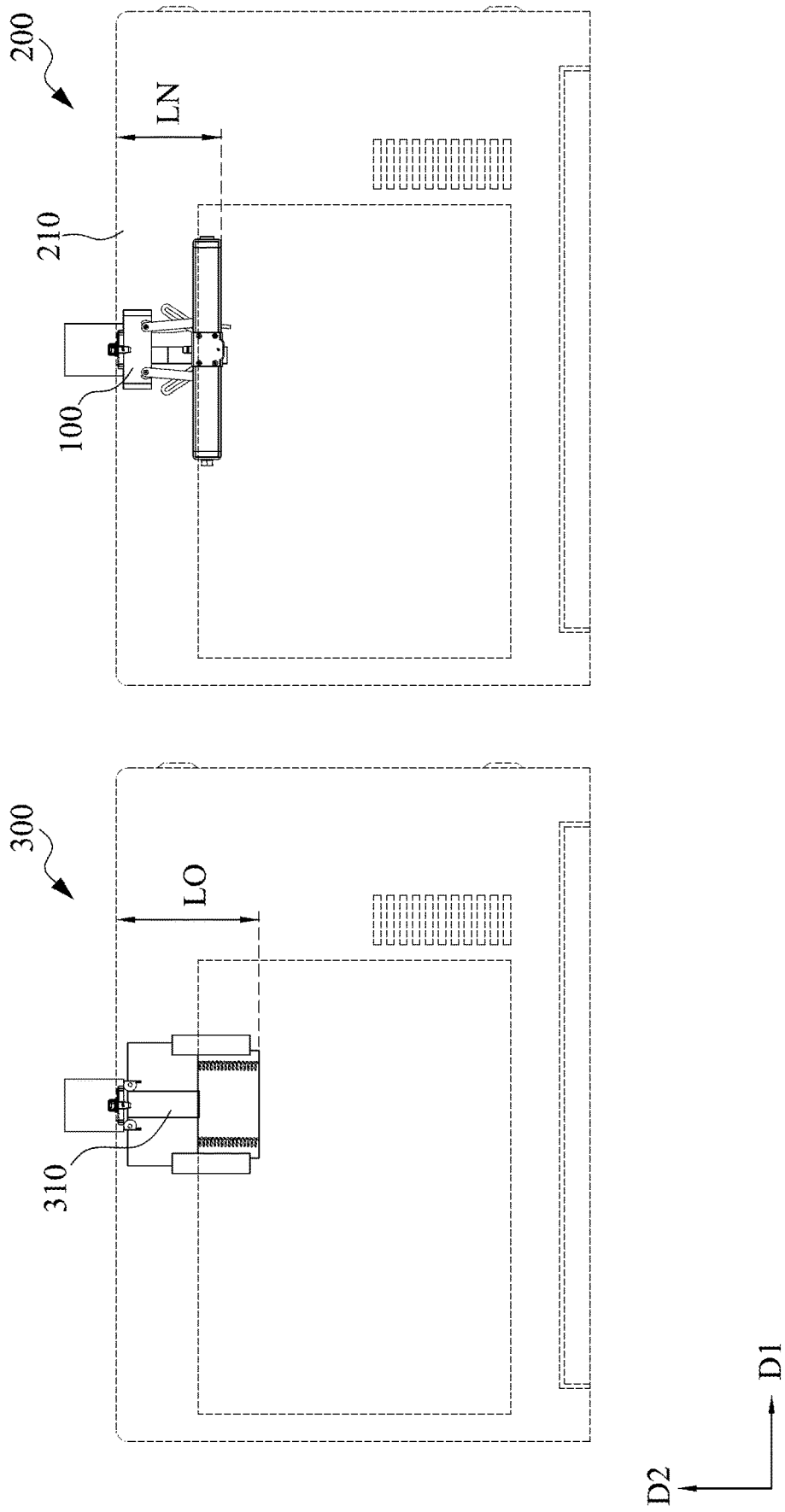
FIG. 15 is a comparative schematic view of a display device according to an embodiment of the present disclosure and a conventional display device.

Reference is made to FIG. 15. FIG. 15 is a comparative schematic view of a display device 200 according to an embodiment of the present disclosure and a conventional display device 300. The display device 200 with the camera lifting structure 100 of the present disclosure is illustrated at right side in FIG. 15 while the conventional display device 300 is illustrated at left side. It is worth to note that, in the present disclosure, the sliding portions 130 slide along the first direction D1 and the elastic elements 120 compress and extend along the first direction D1, which makes the camera module 150 move towards or away from the rail bracket 110 along the second direction D2, and the camera lifting structure 100 switches between the accommodated state and the operation state correspondingly. In comparison, the conventional camera lifting structure 310 of the conventional display device 300 extend and retract the camera vertically with elastic elements compress and extend along the same direction. The dimension of the camera lifting structure 100 occupied within the display housing 210 of the display device 200 along the second direction D2 can be effectively reduced. To be specific, as shown in FIG. 15, the length LN occupied by the camera lifting structure 100 inside the display device 200 is apparently shorter than the length LO occupied by the conventional camera lifting structure 310 inside the display device 300. Therefore, the display device 200 with the camera lifting structure 100 of the present disclosure installed has more inner space saved, which improves the flexibility in design and parts selection of the display device 200. Moreover, damages caused by the camera lifting structure 100 conflicting with other internal parts during assembly and installation process can be avoided.

In conclusion, the aforementioned embodiments of the present disclosure have at least the following advantages:

(1) Since the movement of camera module towards or away from the rail bracket along the second direction to switch between the accommodated state and the operation state, corresponds to the sliding of the sliding portions along the first direction and the compression and extension of the elastic elements along the first direction, the dimension of the camera lifting structure disposed within the display housing of the display device along the second direction can be effectively reduced. As a result, when the camera lifting structure is installed within the display housing of the display device, the inner space for usage of the display device can be effectively saved. Moreover, damage of the camera lifting structure due to contact with other internal components can be avoided.

(2) When the main connecting rods rotate relative to the camera module and the sliding portions, the protruding portions at least partially located inside the slots of the auxiliary connecting rods are also moved inside the slots of the auxiliary connecting rods with respect to the rotation of the main connecting rods, such that the auxiliary connecting rods also rotate relative to the damping module. Since the damping module provides damping to the rotation of the auxiliary connecting rods, the rotation of the main connecting rods relative to the camera module and the sliding portions is also influenced by the damping effect. In this way, the speed at which the sliding portions slide towards each other or towards the fixing portions along the first direction and the speed at which the camera module moves towards or away from the rail bracket along the second direction are under control, and the movement of the camera module towards or away from the rail bracket along the second direction also becomes more stable.

(3) Since the cables pass through the annular structure and are protected by the annular structure, when the camera module moves along the second direction relative to the rail bracket, the cables connected between the camera and the display device will not entangle with or tug on other components of the display device or the camera lifting structure. Thus, damage or even fracture of the cables can be avoided.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A camera lifting structure, comprising:
a rail bracket extending along a first direction and being configured to connect with a display device;
two fixing portions disposed on two opposite ends of the rail bracket along the first direction;
two elastic elements located between the fixing portions and extending along the first direction, each of the elastic elements having a first end and a second end opposite to the first end, each of the first ends connecting with the corresponding fixing portion;
two sliding portions respectively connected with the corresponding second end and being configured to slide along the first direction relative to the rail bracket;
two main connecting rods being free from direct connection with each other, each of the main connecting rods having a third end and a fourth end opposite to the third end, each of the third ends pivotally connecting with the corresponding sliding portion; and
a camera module pivotally connected with the fourth ends and being configured to be manually pressed to move along a second direction relative to the rail bracket, the second direction being perpendicular to the first direction, wherein the sliding portions are pushed to slide along the first direction and the elastic elements are compressed when the camera module is pressed to move downwardly towards the rail bracket.

2. The camera lifting structure of claim 1, further comprising a guiding rod connected between the fixing portions along the first direction and penetrating through the elastic elements and the sliding portions.

3. The camera lifting structure of claim 1, further comprising:
two protruding portions respectively disposed on the corresponding main connecting rod and located between the corresponding third end and the corresponding fourth end;
a damping module, comprising:
a casing connected with the rail bracket and having two spaces therein;
two shafts, each of the shafts comprising a first shaft portion and a second shaft portion, each of the first shaft portions and the corresponding second shaft portion extending along an axis, each of the first shaft portions being located inside the corresponding space, the second shaft portions protruding outside the casing;
a cover connected with the casing to seal up the spaces; and
a plurality of protruding ridges disposed on the first shaft portions and respectively extending along the corresponding axis, the protruding ridges being separated from each other; and
two auxiliary connecting rods, each of the auxiliary connecting rods having a fifth end and a sixth end opposite to the fifth end, each of the fifth ends connecting with the corresponding second shaft portion, each of the auxiliary connecting rods having a slot extending between the corresponding fifth end and the corresponding sixth end,
wherein each of the protruding portions is at least partially located inside the corresponding slot.

4. The camera lifting structure of claim 3, wherein the damping module further comprises:
two first limiting portions respectively located on the corresponding first shaft portion; and
two pairs of second limiting portions connected with the cover, each pair of the second limiting portions is located inside the corresponding space, each of the first limiting portions is limited between the corresponding pair of the second limiting portions.

5. The camera lifting structure of claim 3, further comprising:
two buffering pads located between the sliding portions and respectively disposed on the corresponding sliding portion; and
a central portion disposed on the rail bracket and at least partially located between the buffering pads, the casing being at least partially located inside the central portion.

6. The camera lifting structure of claim 5, further comprising:
a first buckling portion pivotally connected with the camera module;
a torsion spring elastically connected between the camera module and the first buckling portion; and
a second buckling portion disposed on the central portion and being configured to mutually buckle with the first buckling portion.

7. The camera lifting structure of claim 1, wherein the rail bracket comprises a first subsidiary rail bracket and a second subsidiary rail bracket, the first subsidiary rail bracket has a first groove extending along the first direction, the second subsidiary rail bracket has a second groove extending along the first direction, the sliding portions are located between the first subsidiary rail bracket and the second subsidiary rail bracket, each of the sliding portions comprises:
a main body connected with the corresponding second end;
a plurality of first rolling balls rotatably disposed on the main body and being configured to roll at the first groove; and
a plurality of second rolling balls rotatably disposed on the main body and being configured to roll at the second groove.

8. The camera lifting structure of claim 7, wherein a material of the main body is polyoxymethylene.

9. The camera lifting structure of claim 1, wherein the camera module further comprises:
a camera; and
an annular structure connected with the camera along the second direction,
the camera lifting structure further comprises:
at least one cable connected between the camera and the display device and passing through the annular structure.

10. The camera lifting structure of claim 1, further comprising:
at least one washer connected between the corresponding fixing portion and the corresponding elastic element.

11. A display device, comprising:
a display housing having an opening; and
a camera lifting structure at least partially disposed within the display housing, the camera lifting structure comprising:
a rail bracket extending along a first direction;

two fixing portions disposed on two opposite ends of the rail bracket along the first direction;

two elastic elements located between the fixing portions and extending along the first direction, each of the elastic elements having a first end and a second end opposite to the first end, each of the first ends connecting with the corresponding fixing portion;

two sliding portions respectively connected with the corresponding second end and being configured to slide along the first direction relative to the rail bracket;

two main connecting rods, each of the main connecting rods having a third end and a fourth end opposite to the third end, each of the third ends pivotally connecting with the corresponding sliding portion; and a camera module pivotally connected with the fourth ends, the camera module being configured to be manually pressed to move along a second direction close to the rail bracket at least partially through the opening to at least partially align between the sliding portions, the second direction being perpendicular to the first direction, wherein the sliding portions are pushed to slide along the first direction and the elastic elements are compressed when the camera module is pressed to move downwardly towards the rail bracket.

12. The display device of claim 11, wherein the rail bracket connects with the display housing along the first direction.

13. The display device of claim 11, wherein the camera module is configured to move toward the rail bracket and pass through the opening until the camera module is fully accommodated within the display housing.

14. The display device of claim 11, wherein the camera lifting structure further comprises:

two protruding portions respectively disposed on the corresponding main connecting rod and located between the corresponding third end and the corresponding fourth end;

a damping module, comprising:
a casing connected with the rail bracket and having two spaces therein;
two shafts, each of the shafts comprising a first shaft portion and a second shaft portion, each of the first shaft portions and the corresponding second shaft portion extending along an axis, each of the first shaft portions being located inside the corresponding space, the second shaft portions protruding outside the casing;
a cover connected with the casing to seal up the spaces; and
a plurality of protruding ridges disposed on the first shaft portions and respectively extending along the corresponding axis, the protruding ridges being separated from each other; and two auxiliary connecting rods, each of the auxiliary connecting rods having a fifth end and a sixth end opposite to the fifth end, each of the fifth ends connecting with the corresponding second shaft portion, each of the auxiliary connecting rods having a slot extending between the corresponding fifth end and the corresponding sixth end,
wherein each of the protruding portions is at least partially located inside the corresponding slot.

15. The display device of claim 14, wherein the camera lifting structure further comprises:

two first limiting portions respectively located on the corresponding first shaft portion; and two pairs of second limiting portions connected with the cover, each pair of the second limiting portions is located inside the corresponding space, each of the first limiting portions is limited between the corresponding pair of the second limiting portions.

16. The display device of claim 14, wherein the camera lifting structure further comprises:

two buffering pads located between the sliding portions and respectively disposed on the corresponding sliding portion; and a central portion disposed on the rail bracket and at least partially located between the buffering pads, the casing being at least partially located inside the central portion.

17. The display device of claim 16, wherein the camera lifting structure further comprises:

a first buckling portion pivotally connected with the camera module;

a torsion spring elastically connected between the camera module and the first buckling portion; and a second buckling portion disposed on the central portion and being configured to mutually buckle with the first buckling portion.

18. The display device of claim 11, wherein the rail bracket comprises a first subsidiary rail bracket and a second subsidiary rail bracket, the first subsidiary rail bracket has a first groove extending along the first direction, the second subsidiary rail bracket has a second groove extending along the first direction, the sliding portions are located between the first subsidiary rail bracket and the second subsidiary rail bracket.

19. The display device of claim 18, wherein each of the sliding portions comprises:

a main body connected with the corresponding second end;

a plurality of first rolling balls rotatably disposed on the main body and being configured to roll at the first groove; and a plurality of second rolling balls rotatably disposed on the main body and being configured to roll at the second groove.

20. The display device of claim 11, wherein the camera module further comprises:

a camera; and an annular structure connected with the camera along the second direction, the display device further comprises:

at least one cable connected with the camera and passing through the annular structure.

* * * * *